United States Patent [19]
Mochizuki et al.

[11] Patent Number: 5,826,697
[45] Date of Patent: Oct. 27, 1998

[54] PARTS ARRANGER

[75] Inventors: Hiroyuki Mochizuki, Osaka; Yoshimichi Ishii, Neyagawa; Ryoichi Kamatani, Hirakata, all of Japan

[73] Assignee: Matsushita Electric Industrial Co., Ltd., Japan

[21] Appl. No.: 809,579

[22] PCT Filed: Jul. 22, 1996

[86] PCT No.: PCT/JP96/02059

§ 371 Date: May 14, 1997

§ 102(e) Date: May 14, 1997

[87] PCT Pub. No.: WO97/05048

PCT Pub. Date: Feb. 13, 1997

[30] Foreign Application Priority Data

Jul. 25, 1995 [JP] Japan ................................. 7-188902
Sep. 25, 1995 [JP] Japan ................................. 7-245716

[51] Int. Cl.[6] .................................................. B65G 47/24
[52] U.S. Cl. ........................... 198/392; 198/444; 221/167; 221/13
[58] Field of Search ..................... 198/392, 391, 198/753, 750.1, 751, 771, 757, 444; 221/167, 13, 14

[56] References Cited

U.S. PATENT DOCUMENTS

| | | | |
|---|---|---|---|
| 2,924,355 | 2/1960 | Birkett | 221/167 |
| 3,407,964 | 10/1968 | Wysocki et al. | 221/167 |
| 3,710,920 | 1/1973 | Sterling | 198/392 |
| 4,154,329 | 5/1979 | Hildenbrand | 198/392 |
| 4,947,982 | 8/1990 | Miyaki | 198/391 |

FOREIGN PATENT DOCUMENTS

| | | | |
|---|---|---|---|
| 2-188313 | 7/1990 | Japan . | |
| 404354718A | 12/1992 | Japan | 198/392 |
| 6-349867 | 12/1994 | Japan . | |

*Primary Examiner*—Joseph E. Valenza
*Assistant Examiner*—Khoi H. Tran
*Attorney, Agent, or Firm*—Parkhurst & Wendel

[57] ABSTRACT

A parts arranger comprising a rotating disk (4) which has a plurality of part accommodating holes (6) for accommodating screws (5) arranged in a circumferential row or a plurality of concentric rows and is supported in a condition inclined at a predetermined angle θ relative to a horizontal plane, a circumference guide (7) which is disposed along an outer circumference of the rotating disk (4) so as to be substantially perpendicular to a surface of the rotating disk, and a stepping motor (1) which rotates the rotating disk (4) at a predetermined angle in a normal direction and then at a predetermined angle in a reverse direction.

9 Claims, 6 Drawing Sheets

PARTS ARRANGER

FIELD OF THE INVENTION

The present invention relates to a parts arranger which arranges parts to enable successive feeding in assembly works or preparations for machining works.

BACKGROUND ART

There is known a parts arranger which is composed, as disclosed by Japanese Patent Application Laid-Open No. 57-99823, of a rotating disk having a large number of accommodating holes formed so as to correspond to a shape of parts at intervals in a circumferential direction, a driving source for rotatingly driving the rotating disk in a condition where it is inclined at a predetermined angle relative to a horizontal plane, and a circumference guide which is disposed around an outer circumference of the rotating disk and close to an outer circumference of the rotating disk, and has an inner circumferential surface substantially perpendicular to a surface of the rotating disk.

When the rotating disk is continuously rotated in a direction by the driving source and parts are disposed on the rotating disk in the parts arranger having the configuration described above, the parts are rolled and the rotating disk gives centrifugal forces to the rolling parts, whereby the parts are collected in the vicinity of the circumference guide and moved circularly along the inner circumferential surface of the circumference guide. The parts which are moved circularly are tilted and their directions are changed due to frictional contact with the surface of the rotating disk. When attitudes of the parts are matched with directions of the large number of accommodating holes, the parts fit into the accommodating holes by their own weights and are arranged accordingly.

The known parts arranger which has the configuration described above is practically usable with no substantial problem when the parts have a relatively large shape and may not be accommodated in a restricted direction. When parts such as fine screws are to be arranged vertically with their heads kept upward, for example, it is extremely difficult to arrange the screws with the parts arranger since the screws have centers of gravity in their heads in most cases. For stable arranging and accommodating such screws, it is necessary to rotate the rotating disk a large number of turns so as to extremely increase occasions when the screws fit into the accommodating holes, thereby posing problems to require a long time for arranging the parts, prolong a time for the entire assembling or machining work and enhance a cost for the work.

DISCLOSURE OF THE INVENTION

A primary object of the present invention is to solve these problems, or to provide a parts arranger which is capable of performing parts arrangement in a short time.

For accomplishing this object, the parts arranger according to the present invention comprises a rotating disk which has a plurality of parts accommodating holes formed in a circumferential row or a plurality of concentric rows and is supported in a condition where it is inclined at a predetermined angle relative to a horizontal plane, and a circumference guide which is disposed along an outer circumference of the rotating disk and substantially perpendicular to the rotating disk, and is characterized in that the parts arranger further comprises a driving source which rotates the rotating disk at a predetermined angle in a normal direction and sequentially rotates it at a predetermined angle in a reverse direction.

The parts arranger which has the configuration described above is capable of springing up parts and incessantly changing attitudes of the parts on the rotating disk by driving the rotating disk in both the normal and reverse directions at the predetermined angles with the driving source. Accordingly, the parts arranger according to the present invention increases occasions when parts fit into the accommodating holes as compared with the case where the rotating disk is rotated only in one direction, thereby making it possible to arrange parts in a shorter time.

BEST MODE FOR CARRYING OUT THE INVENTION

Now, embodiments of the parts arranger according to the present invention, or parts arrangers which arrange and feed screws, will be described with reference to the accompanying drawings.

(First Embodiment)

The first embodiment of the present invention will be described with reference to FIGS. 1 through 3.

Figure 1:
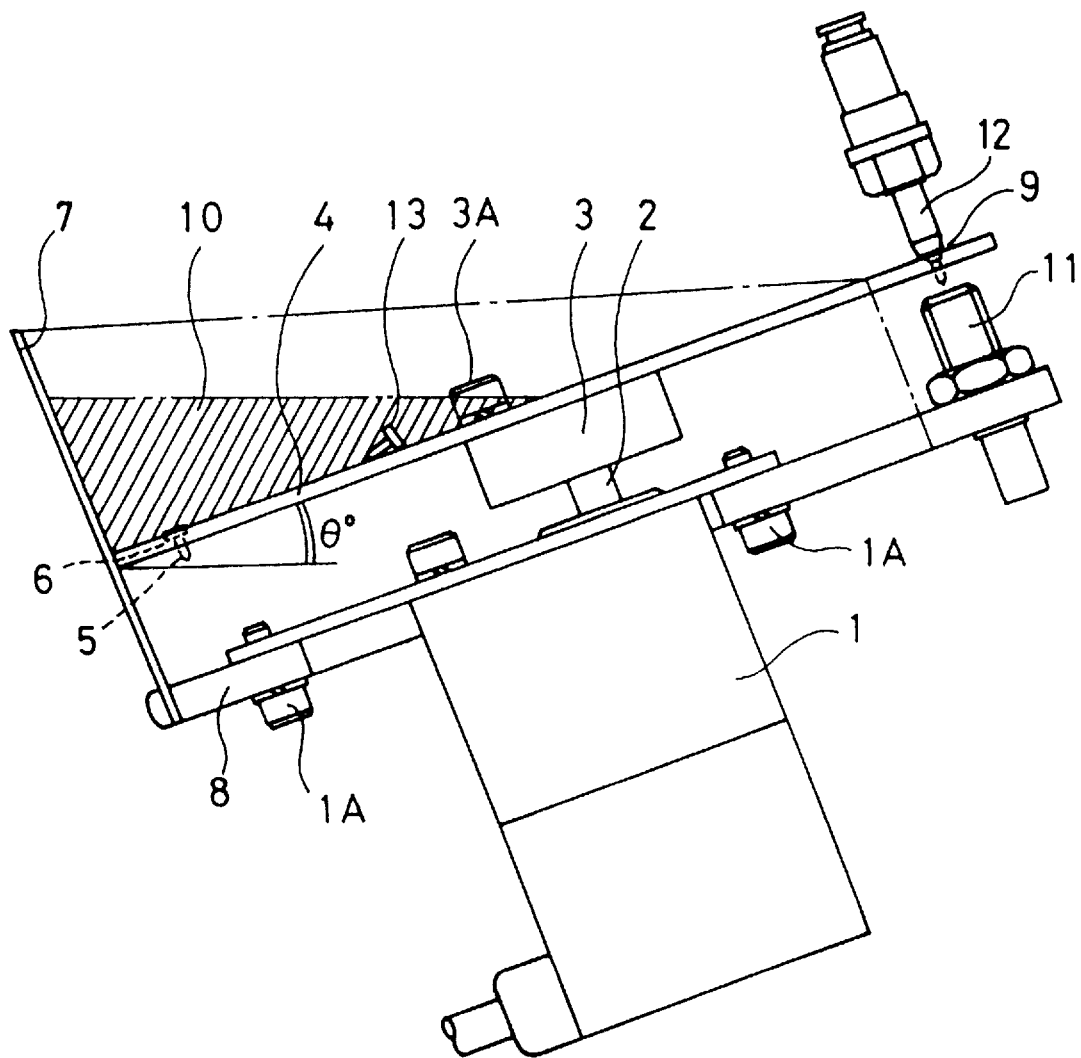
FIG. 1 is a side view illustrating a first embodiment of the parts arranger according to the present invention.

In FIG. 1, a reference numeral 1 represents a stepping motor which can rotate repeatedly in a normal and reverse directions, and is fixed with a plurality of bolts 1A to a disk 8 disposed in a condition inclined θ° relative to a horizontal plane. A rotating force of the stepping motor 1 is transmitted to a mounting head 3 which is fixed to a driving shaft 2 of the stepping motor 1.

A rotating disk 4 which has a shape substantially the same as that of the disk 8 is replaceably mounted on a top surface of the mounting head 3 with a plurality of bolts 3A.

In the configuration described above, the rotating disk 4 is supported by the stepping motor 1 in a condition inclined θ° relative to the horizontal plate as shown in FIG. 1 and is rotated by turning the mounting head 3 with the stepping motor 1.

Figure 2:
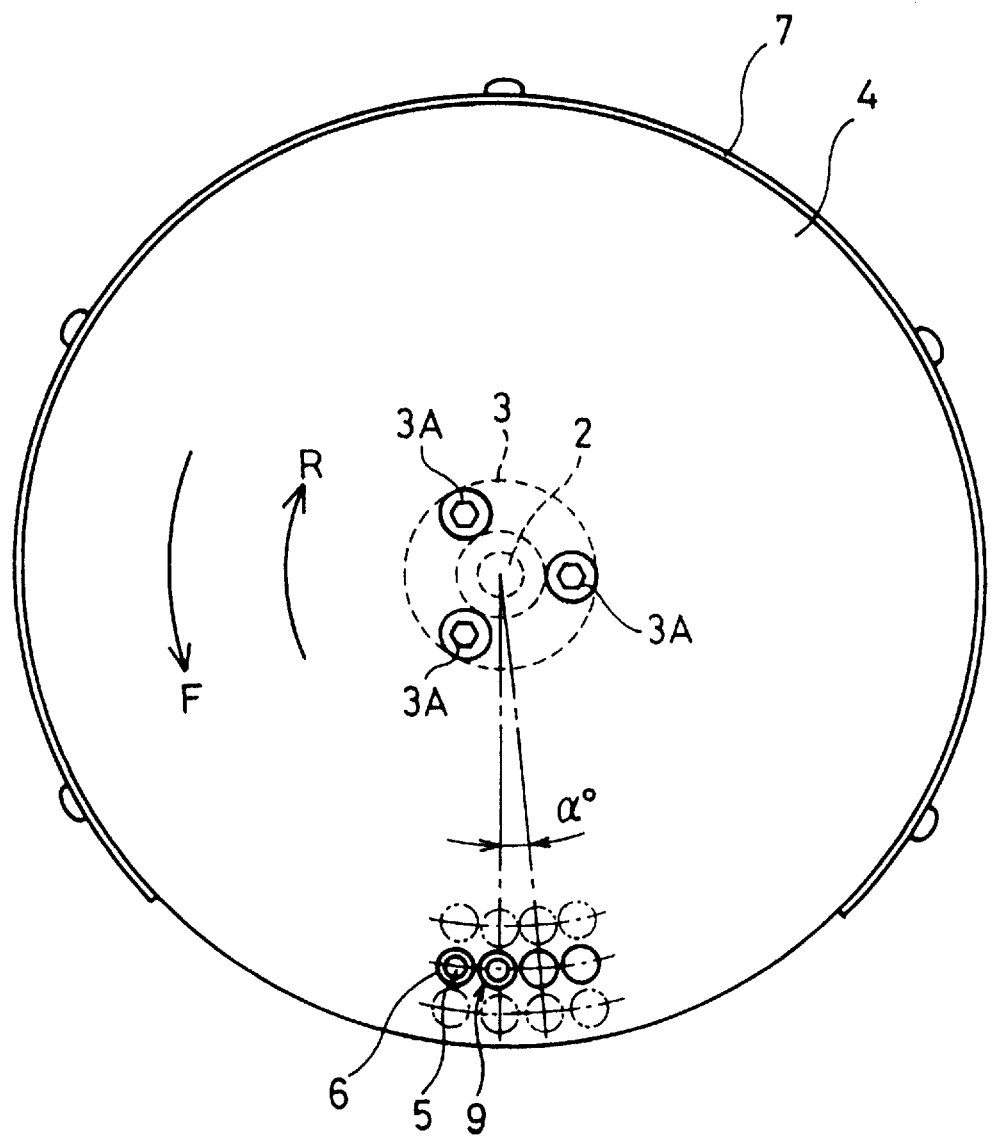
FIG. 2 is plan view illustrating the first embodiment of the parts arranger according to the present invention.
Figure 3:
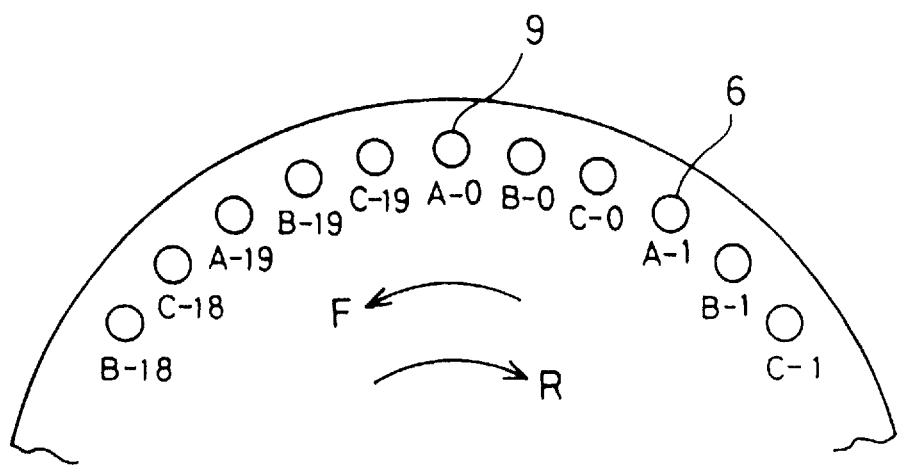
FIG. 3 is a plan view illustrating main members of the rotating disk of the parts arranger according to the present invention.

Further, a plurality of accommodating holes 6 corresponding to a shape of a screw 5 are formed in a circumferential portion of a surface of the rotating disk 4 at intervals of a pitch angle of α° in a circumferential direction as shown in FIGS. 2 and 3. In the first embodiment, 60 accommodating holes 6 (A-0, B-0, C-0, A-1, B-1, C-1, . . . A-19, B-19, C-19) are formed at a pitch angle of 6° in the rotating disk 4.

Further, an arc-shaped circumference guide 7 which has an inner circumferential surface substantially perpendicular to the surface of the rotating disk 4 is disposed around the rotating disk 4 in the vicinity of an outer circumference thereof and fixed to an outer circumference of the disk 8.

Furthermore, an uppermost point 9 of the rotating disk 4 is used as a point for feeding the screw 5 and a proximity sensor 11 is disposed on the disk 8 at a location corresponding to the uppermost point 9 for detecting presence or absence of the screw 5 is in the accommodating hole 6 positioned to the uppermost point 9, and an adsorbing head 12 which adsorbs and takes out the screw 5 is disposed over the uppermost point 9.

Description will be made of a driving method for the stepping motor 1, or a driving method for the rotating disk 4.

The stepping motor 1 rotates the rotating disk 4 at an angle of $\phi°$ in a normal direction indicated by an arrow F in FIG. 2 and then rotates it at an angle of $\phi°$ ($<\phi°$) in a reverse direction indicated by an arrow R. Since the rotating angles are set as described above, the rotating disk 4 is displaced at an angle of ($\phi°-\phi°$) by a cycle of driving motion consisting of the normal rotation and the reverse rotation of the stepping motor 1. In the first embodiment, the angle $\phi°$ and the angle $\phi°$ are set at integral times of the pitch angle $\alpha°$.

When $\alpha°=6°$, $\theta°=20$ to $30°$, $\phi°=18°$ and $\phi°=12°$, for example, the rotating disk 4 is rotated at the pitch angle ($6°$), or ($18°-12°$), by a cycle of driving motion consisting of the normal rotation at three pitch angles and the reverse rotation at two pitch angles.

Explanation will be made of the parts arranger which is configured as described above.

When screws 13 are placed on the rotating disk 4, the screws 13 are accumulated on a lower portion of the rotating disk 4 as indicated by slash lines in FIG. 1 due to the inclination $\phi°$ of the rotating disk 4, thereby forming a screw haunt 10.

The screws 13 accumulated in the screw haunt 10 are tilted and changed in attitudes thereof many times as the rotating disk 4 is rotatingly driven in the two normal and reverse directions. Accordingly, attitudes of the screws 13 are coincident with directions of the large number of accommodating holes 6, whereby the screws 13 fit into the accommodating holes 6 by their own weights and are stable in conditions like that of the screw 5. Further, the screws 13 which do not fit into the accommodating holes 6 and the screws 13 which fit the holes from their heads are shaken down from the accommodating holes 6 by the normal and reverse rotations of the rotating disk 4, and due to the inclination $\phi°$ returned to the screw haunt 10 and repeatedly are given occasions to fit into the accommodating holes 6.

By a cycle of driving motion consisting of the normal rotation at three pitch angles and the reverse rotation at two pitch angles, the rotating disk 4 is rotated at a pitch angle ($6°$), or ($18°-12°$), and the accommodating holes 6 are displaced at a pitch angle in the circumferential direction.

The proximity sensor 11 confirms presence or absence of the screw 5 in one of the accommodating holes 6 positioned to the feeding point, or having reached the uppermost point of the inclined rotating disk 4.

When the proximity sensor 11 confirms that the screw 5 is present, the adsorbing head 12 takes out the screw 5 after adsorption. When the proximity sensor 11 confirms that the screw 5 is absent, the rotating disk 4 is rotated in steps of the pitch angle $\alpha°$ or a multiple of $\alpha°$ until the proximity switch 11 confirms presence of the screw 5, thereby realizing stable feeding of the screw 5. After the screw 5 is taken out, the rotating disk 4 is rotatingly driven in the two normal and reverse directions, and the next accommodating hole 6 attains and is positioned to the uppermost point 9.

By rotatingly driving the rotating disk 4 in the two normal and reverse directions as described above, it is possible to spring up the screws 13 and incessantly change attitudes thereof on the rotating disk 4. Accordingly, the parts arranger according to the present invention allows the screws 13 to be fitted into accommodating holes 6 at more occasions than those available by rotating the rotating disk 4 in one direction and can arrange parts in a shorter time, thereby making it possible to reduce a time required for an entire work such as assembly or machining and lower a cost for the work.

Further, the parts arranger according to the present invention is capable of feeding and positioning the screw 5 to the feeding point for the screw 5 since it uses the proximity sensor 11 for detecting presence or absence of the screw 5 in the accommodating hole 6 and rotates the rotating disk 4 until the proximity sensor 11 detects presence of the screw 5.

Another driving method for the stepping motor 1 will be described below.

The stepping motor 1 rotates the rotating disk 4 at an angle of $\phi°$ in the normal direction indicated by the arrow F and the reverse direction indicated by the arrow R respectively in FIG. 2, and then rotates the disk at an angle of $\phi°$ in the normal direction. When the angles are set as described above, the rotating disk 4 is displaced at the angle $\phi°$ by a cycle of driving motion consisting of the rotations in the two normal and reverse directions, and the rotation in the normal direction. In this embodiment, the angle $\theta°$ and the angle $\theta°$ are set at integral times of a pitch angle $\alpha°$.

When $\alpha°=6°$, $\theta°=20$ to $30°$, $\phi°=12°$ and $\phi°=18°$, for example, the rotating disk 4 is rotated finally at three pitch angles ($18°$) by a cycle of driving motion consisting of the normal rotation and the reverse rotation each corresponding to two pitch angles, and the normal rotation corresponding to three pitch angles. When the rotating disk 4 is rotated as described above, an accommodating hole A-0 shown in FIG. 3 returns again to the uppermost point 9 upon completing the twentieth motion and accommodating holes B-0, B-1, . . . C-0, C-1, . . . which are adjacent sequentially to the holes A-0, A-1, A-2 cannot be positioned to the uppermost point 9. In the embodiment, $\phi°$ is set at $24°$ for the twentieth motion only so that all the accommodating holes 6 are positioned to the uppermost point 9 after completing three turns. When the angles are set as described above, each of the accommodating holes 6 passes through the screw haunt 10 a larger number of times, whereby the screws 13 has larger occasions to be fitted and arranged into the accommodating hole 6.

When the stepping motor 1 is driven by the method described above, it rotates the rotating disk 4 a plurality of turns (three turns in this embodiment) until one accommodating hole 6 is positioned to the uppermost point 9, whereby the screw 5 is fitted into the accommodating holes 6 at more occasions than those available by turning the rotating disk 4 only in one direction and parts can be arranged in a shorter time.

In the first embodiment described above, the screw 5 fits into the accommodating 6 in a slanted attitude at the uppermost point 9 as shown in FIG. 1 and the adsorbing head 12 is supported in a slanted attitude so that it adsorbs and takes out the screw 5 in an oblique direction. When the screw 5 and the adsorbing head 12 are supported in such slanted attitudes, however, it is rather hard to handle and take out the screw 5 without fail by the adsorbing head 12, and when the adsorbing head 12 fails to take out the screw 5 or drops it, it is necessary to rotate the rotating disk 4 once again for adsorbing another screw, thereby lowering a working efficiency. Accordingly, it is desirable to set the screw 5 at its vertical attitude and adsorb it vertically. Second through fourth embodiments which are described below are configured to vertically adsorb and take out the screw 5.

(Second Embodiment)

Figure 4:
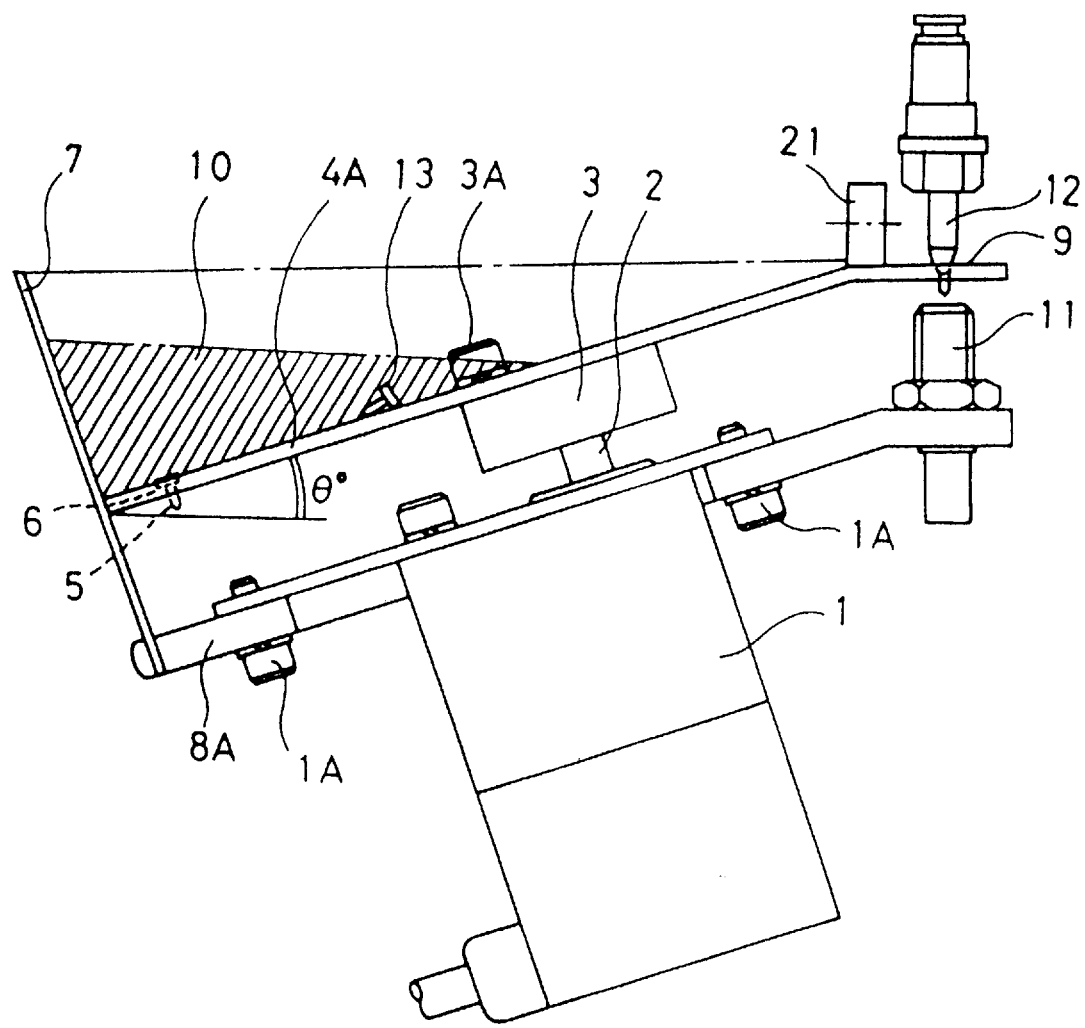
FIG. 4 is a side view illustrating a second embodiment of the parts arranger according to the present invention.

The second embodiment will be described with reference to FIG. 4. Only differences from the first embodiment will be described.

In the second embodiment which is configured to keep a screw 5 in its vertical attitude in an accommodating hole 6 positioned to the uppermost point 9, a rotating disk 4A which is rotatingly driven by a stepping motor 1 is made of an elastic material having a restoring force such as urethane rubber or thin a metal sheet and a plurality of rollers 21 are disposed for pressing the rotating disk 4A from above to bend it so as to form a horizontal surface at an uppermost point 9. After passing by the plurality of the rollers 21, the rotating disk 4A resumes a flat surface by its restoring force.

Guide members may be used in place of the rollers. Further, a single roller 21 may be used. Furthermore, it is possible to facilitate to fit screws 13 by disposing a plurality of rollers which push up the rotating disk 4A from downside so as to form a horizontal surface at a location symmetrical with the uppermost point 9.

Since the uppermost point 9 is located on the horizontal surface formed by the function of the rollers 21, the screw 5 fitted in the accommodating hole 6 positioned to the uppermost point 9 is kept in its vertical attitude. In correspondence to the attitude of the screw 5, an adsorbing head 12 is vertically disposed over the screw 5 (over the uppermost point 9 located on the horizontal surface). For horizontally supporting a proximity sensor 11 which detects presence or absence of the screw 5 in the accommodating hole 6 positioned to the uppermost point 9, a location of a disk 8A opposed to the uppermost point 9 is formed as a horizontal surface.

A driving method for the rotating disk 4A, and operations for arranging and taking out the screw 5 are quite similar to those in the first embodiment described above and will not be explained in particular.

When the rotating disk 4A is rotatingly driven in the two normal and reverse directions at short cycles as described above, parts can be arranged in a short time and a time required for an entire work such as assembly or machining can be shortened. When the screw 5 fitted in the accommodating hole 6 positioned to the uppermost point 9 is kept in its vertical attitude by forming the horizontal surface on the rotating disk 4A positioned to the uppermost point 9, and the screw 5 is adsorbed and taken out vertically by the adsorbing head 12, the screw 5 can be handled without fail and a working efficiency can be enhanced.

(Third Embodiment)

Figure 5:
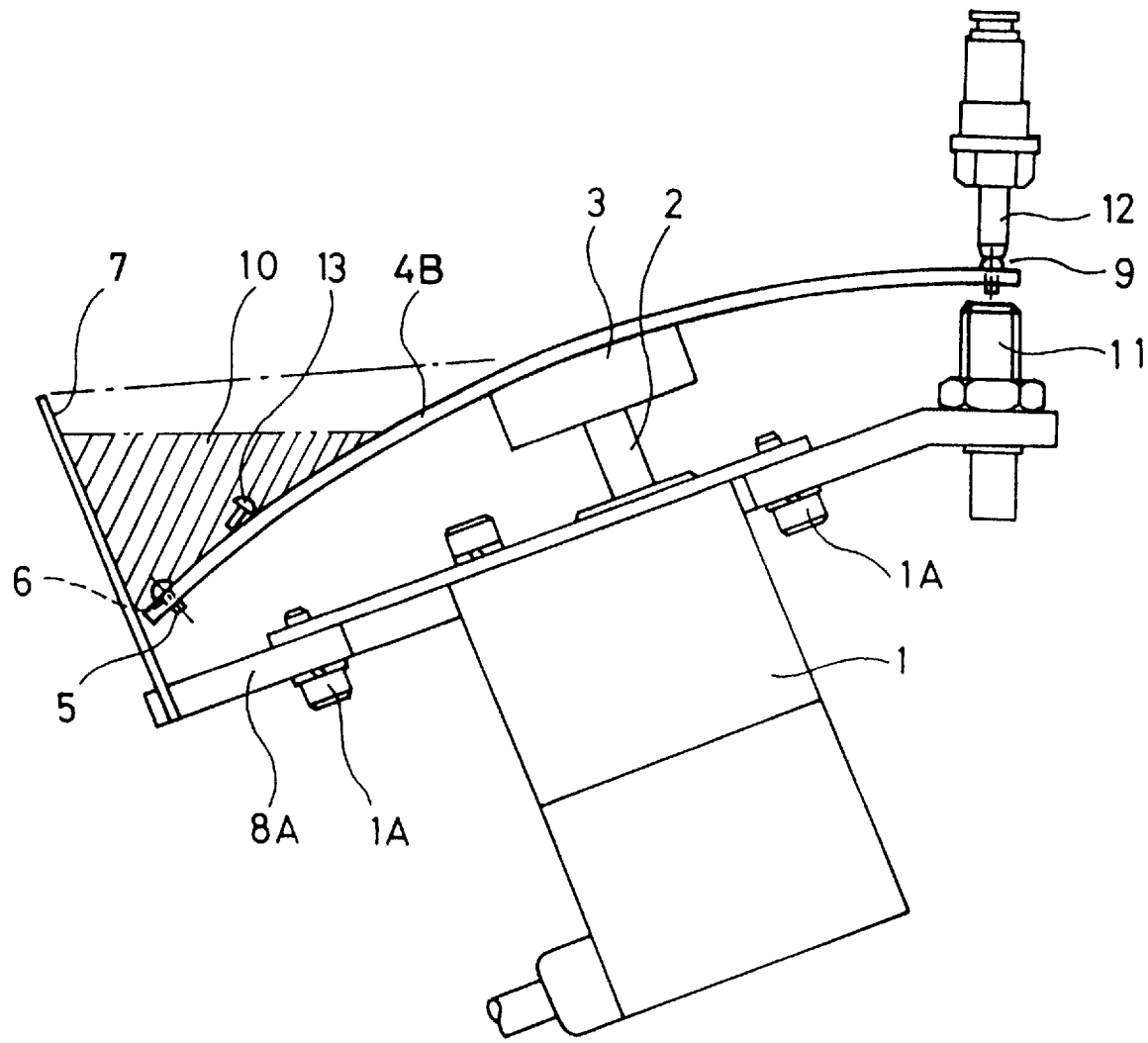
FIG. 5 is a side view illustrating a third embodiment of the parts arranger according to the present invention.

The third embodiment will be described with reference to FIG. 5. Description will be made only of differences from the first embodiment.

For keeping a screw 5 in its vertical attitude when fitted in an accommodating hole 6 positioned to an uppermost point 9, a rotating disk 4B which is rotatingly driven by a stepping motor 1 is formed in an arc shape and fixed to the stepping motor 1 so that it has a horizontal tangential line at a location of the accommodating hole 6 positioned to the uppermost point 9.

Owing to this shape of the rotating disk 4B, the accommodating hole 6 positioned to the uppermost point 9 is horizontally set and the screw 5 fitted in the accommodating hole 6 positioned to the uppermost point 9 is kept in its vertical attitude. In correspondence to this attitude of the screw 5, an adsorbing head 12 is vertically disposed over the screw 5 (over the uppermost point 9 located on a horizontal surface).

A driving method for the rotating disk 4B, and motions for arranging and taking out the screw 5 are the same as those in the first embodiment and will not be described in particular.

When the rotating disk 4B is rotatingly driven in the two normal and reverse directions at short cycles, parts can be arranged in a short time and a time required for an entire work such as assembly or machining can be shortened. When the screw 5 fitted in the accommodating hole 6 positioned to the uppermost point 9 is kept in its vertical attitude, and vertically adsorbed and taken out by the adsorbing head 12, the screw 5 can be handled without fail and a working efficiency can be enhanced.

Further, the third embodiment permits optionally changing an inclination angle of the accommodating hole 6 by modifying a location of the accommodating hole 6 in the rotating disk 4B.

(Fourth Embodiment)

Figure 6A:
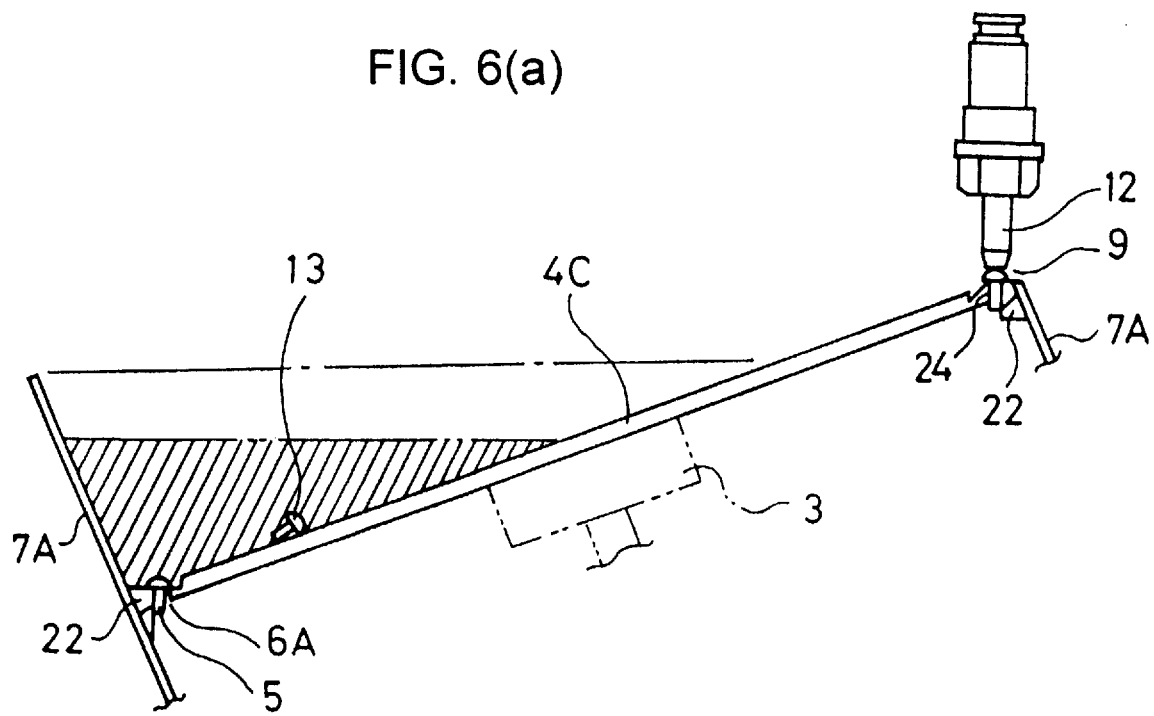
FIGS. 6(*a*) and 6(*b*) are a side view illustrating main members of a fourth embodiment of the parts arranger according to the present invention and a plan view illustrating main members of a rotating disk used in this embodiment.
Figure 6B:
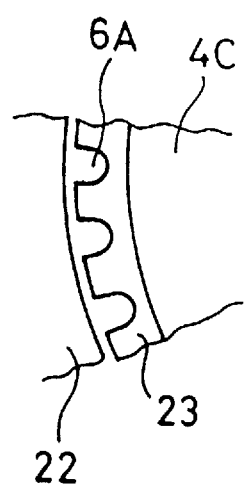

The fourth embodiment will be described with reference to FIGS. 6(a) and 6(b). Only differences from the first embodiment will be described.

In the fourth embodiment, accommodating holes 6A of the rotating disk 4C are formed as notches which are open on a side of an outer circumference, and a rotating disk 4C having these accommodating holes 6A is formed so as to have an outer circumference 23 which is made horizontal at a lower end thereof and outer edge 24 is vertical when positioned at an uppermost point 9. Further, a circumference guide 7A is disposed all around the entire circumference of the rotating disk 4C and a guide member 22 is disposed on an inside surface of the circumference guide 7A for vertically supporting a screw 5 in the accommodating hole 6A.

Owing to the forms of the rotating disk 4C and the circumference guide 7A, a screw 5 fitted in an accommodating hole 6 located to the uppermost point 9 is kept in its vertical attitude. In correspondence to this attitude of the screw 5, an adsorbing head 12 is disposed vertically over the screw 5.

A driving method for the rotating disk 4C, and motions to arrange and take out the screw 5 remain unchanged from those in the first embodiment and will not be described in particular.

When the rotating disk 4C is rotatingly driven in the two normal and reverse directions at short cycles as described above, parts can be arranged in a short time and a time required for an entire work such as assembly or machining can be shortened. When the screw 5 which is fitted in the accommodating hole 6 positioned to the uppermost point 9 is kept in its vertical attitude owing to the forms of the rotating disk 4 and the circumference guide 7A, and the screw 5 is vertically adsorbed and taken out by the adsorbing head 12, the screw 5 can be handled without fail and a working efficiency can be enhanced.

Though the accommodating holes 6 are arranged in a row along the circumference of the rotating disk 4 in each of the first through third embodiment described above, it is possible to dispose the accommodating holes 6 in a plurality of concentric rows as indicated by imaginary lines in FIG. 2 so that a large number of the screws 13 can fit into the accommodating holes 6 by a cycle of driving motion, thereby enhancing an efficiency. In this case, it is necessary to dispose the proximity sensor 11 so as to oppose to each row of the accommodating holes 6 and use a mechanism to displace the adsorbing head 12 in the radial direction.

We claim:

1. A parts arranger comprising:

a rotating disk which has part accommodating holes for accommodating parts disposed in a circumferential row or a plurality of concentric rows and is supported in a condition inclined at a predetermined angle relative to a horizontal plane; and a circumference guide which is disposed perpendicularly to a surface of said rotating disk, characterized in that said parts arranger comprises a driving source which rotatingly drives said rotating disk at a predetermined angle in a normal direction and then at a predetermined angle in a reverse direction.

2. A parts arranger according to claim 1, characterized in that the part accommodating holes of said rotating disk are disposed at a predetermined pitch angle.

3. A parts arranger according to claim 2, characterized in that said rotating disk is rotatingly driven by said driving source in the normal direction at a first multiple of said pitch angle for the part accommodating holes and then in the reverse direction at a second multiple smaller than said first multiple of said pitch angle.

4. A parts arranger according to claim 2, characterized in that said rotating disk is rotatingly driven by said driving source in each of the normal and reverse directions, at the first multiple of said pitch angle for the part accommodating holes and in the normal direction then at a second multiple of said pitch angle.

5. A parts arranger according to claim 1, characterized in that said rotating disk is rotated in a plurality of turns by said driving source until each of the part accommodating holes attains to a feeding point for feeding parts and is positioned thereto.

6. A parts arranger according to claim 1, characterized in that said parts arranger comprises a sensor for detecting presence or absence of a part in the accommodating hole positioned to a feeding point for feeding parts and, when absence of the part is detected, rotates the rotating disk until the sensor detects presence of the part.

7. A parts arranger according to claim 1, characterized in that said rotating disk is made of an elastic material having a restoring force, and said parts arranger comprises a member which deforms said rotating disk so as to have a horizontal portion at a feeding point for feeding parts.

8. A parts arranger according to claim 1, characterized in that said rotating disk is composed of an arc-shaped member which has a horizontal tangential line at a portion of the accommodating hole located at a feeding point for feeding parts.

9. A parts arranger according to claim 1, characterized in that said rotating disk has part accommodating holes which are formed as notches open on a side of an outer circumference, and that a guide member is disposed all around a circumference guide for vertically supporting parts fitted in said notches.

* * * * *